United States Patent [19]

Poirot et al.

[11] Patent Number: 5,712,353

[45] Date of Patent: Jan. 27, 1998

[54] GAS PHASE POLYMERIZATION PROCESS

[75] Inventors: Eugene Edmond Poirot, Baytown; Vispi Ruston Sagar, League City; Scott Kevin Jackson, Baytown, all of Tex.

[73] Assignee: Exxon Chemical Patents Inc., Houston, Tex.

[21] Appl. No.: 332,162

[22] Filed: Oct. 31, 1994

[51] Int. Cl.$^6$ .................................................... C08F 2/34
[52] U.S. Cl. ............................ 526/88; 526/168; 526/901
[58] Field of Search .................... 526/160, 88, 168, 526/901

[56] References Cited

U.S. PATENT DOCUMENTS

| | | | |
|---|---|---|---|
| 4,871,705 | 10/1989 | Hoel | 526/129 |
| 4,994,534 | 2/1991 | Rhoe et al. | 526/88 |
| 5,017,665 | 5/1991 | Chang | 126/129 |
| 5,100,979 | 3/1992 | Eisinger et al. | 526/88 |
| 5,106,926 | 4/1992 | Eisinger et al. | 526/88 |
| 5,106,927 | 4/1992 | Rifi et al. | 526/133 |
| 5,229,478 | 7/1993 | Floyd et al. | 526/160 |
| 5,241,031 | 8/1993 | Mehta | 526/348.1 |
| 5,332,706 | 7/1994 | Nowlin et al. | 526/116 |
| 5,376,439 | 12/1994 | Hodgson et al. | 525/221 |
| 5,439,995 | 8/1995 | Bailly et al. | 526/125 |

FOREIGN PATENT DOCUMENTS

| | | |
|---|---|---|
| 0120503B1 | 10/1984 | European Pat. Off. . |
| 0417710A2 | 3/1991 | European Pat. Off. . |
| 0526955A1 | 2/1993 | European Pat. Off. . |
| 93/04486 | 3/1993 | WIPO . |
| 93/09148 | 5/1993 | WIPO . |
| 94/03509 | 2/1994 | WIPO . |
| 94/25497 | 11/1994 | WIPO . |

*Primary Examiner*—Thomas R. Weber
*Attorney, Agent, or Firm*—Jaimes Sher

[57] ABSTRACT

The present invention relates to a gas phase process for the polymerization of olefins utilizing a metallocene catalyst system to produce polymers having a low density and a relatively high molecular weight. More particularly, the gas phase process of the invention is directed forward the production of very low density polymers, for example rubbers, elastomers and plastomers.

47 Claims, No Drawings

GAS PHASE POLYMERIZATION PROCESS

FIELD OF THE INVENTION

The present invention relates to a gas phase polymerization process for producing polymers having a very low density, such as rubbers, elastomers and plastomers.

BACKGROUND OF THE INVENTION

It is known to produce polymers having a low density in a gas phase process using a low pressure fluidized bed reactor. When producing these polymers a relatively large mount of comonomer is needed. As a result of the low vapor pressure of the comonomer, which condenses in a polymerization reactor and is absorbed in the polymer resulting in a swollen, sticky or wet resin. This sticky polymer or resin impedes the fluidization of the polymer particles in the reactor resulting in very poor reactor operability. Furthermore, the sticky polymers are very difficult for down-stream equipment to handle, for example in conveying, and storage of these sticky polymers is very difficult.

U.S. Patent No. 4,994,534 describes a process for producing polymers, referred to as "sticky polymers", such as ethylene/propylene rubber where carbon black, silica or clay is added to the reactor during polymerization. Addition of these materials to the reactor not only results in polymer that cannot be used in many applications, but can result in the fouling of heat exchangers, compressors and other like parts of reactor systems.

Similarly, U.S. Patent No. 4,970,279 and PCT Publication WO 88/02379, published Apr. 7, 1988 discusses adding pulverulent inorganic materials, such as silica or alumina to the reactor.

Related U.S. Patent Nos. 5,100,979 and 5,106,926 describe a process for preparing ethylene/1-octene copolymers using either a particular titanium based catalyst system or a particular vanadium based catalyst system under conditions that are not commercially acceptable.

U.S. Patent No. 5,017,665 describes a gas phase polymerization process of ethylene, butene-1 and 1,4-hexadiene in the presence of a metallocene/alumoxane catalyst system to produce a polymer having a low density and very high melt index indicative of a very low molecular weight polymer.

Therefore, it would be highly desirable to provide a commercially useful gas phase polymerization process for producing, a relatively high molecular weight polymer having a low density.

SUMMARY OF THE INVENTION

This invention relates to a gas phase polymerization process for producing elastomeric or plastomeric polymers in the presence of a metallocene polymerization catalyst. The polymers having a density less than 0.90 g/cc and a melt index less than 20 dg/min and/or a density less than 0.88 g/cc and a melt index less than about 30 dg/min.

In one embodiment, the invention provides for a polymerization process for polymerizing two or more olefins, optionally with at least one diene monomer, in the presence of a metallocene catalyst system to produce a polymer having a relatively high molecular weight and a density less than 0.90 g/cc. The polymers of the invention are useful in a variety of end-use applications, particularly in film applications.

DETAILED DESCRIPTION OF THE INVENTION

Introduction

The invention is directed to a gas phase polymerization for producing polymers having a very low density sometimes referred to as rubbers, elastomers or plastomers. It has been discovered that these polymers can be produced commercially in a gas phase process using a metallocene catalyst with excellent operability. In addition it was surprising that the process could be operated at a temperature very dose to the melting temperature of the polymer, thus maximizing the production capabilities of the process.

While an agitator or stirrer in the process of the invention can be used it was found in the preferred embodiment not to be essential. Also, it was discovered that transitioning between grades, which typically requires numerous process changes, can be performed so as not to detrimentally effect reactor operability.

Catalyst Components and Catalyst Systems of the Invention

Metallocene catalysts, for example, are typically those bulky ligand transition metal compounds derivable from the formula:

where L is a bulky ligand; A is leaving group, M is a transition metal and m and n are such that the total ligand valency corresponds to the transition metal valency. Preferably the catalyst is four co-ordinate such that the compound is ionizable to a $1^+$ charge state.

The ligands L and A may be bridged to each other, and if two ligands L and/or A are present, they may be bridged. The metallocene compound may be full-sandwich compounds having two or more ligands L, which may be cyclopentadienyl ligands or cyclopentadiene derived ligands, or half-sandwich compounds having one ligand L, which is a cyclopentadienyl ligand or derived ligand.

In one embodiment, at least one ligand L has a multiplicity of bonded atoms, preferably 4 to 20 carbon atoms, that typically is a cyclic structure or ring system such as a ligand, which may be substituted or unsubstituted. Non-limiting examples of ligands include a cyclopentadienyl ligand, or a cyclopentadienyl derived ligand such as an indenyl ligand, a benzindenyl ligand or a fluorenyl ligand and the like or any other ligand capable of η-5 bonding to a transition metal atom. One or more of these bulky ligands may be π-bonded to the transition metal atom. The transition metal atom may be a Group 4, 5 or 6 transition metal and/or a metal from the lanthanide and actinide series, preferably the transition metal is of Group 4. Other ligands may be bonded to the transition metal, such as a leaving group, such as but not limited to hydrocarbyl, hydrogen, or any other univalent anionic ligand. Non-limiting examples of metallocene catalysts and catalyst systems are discussed in for example, U.S. Pat. Nos. 4,530,914, 4,871,705, 4,937,299, 4,952,716, 5,124,418, 5,017,714, 5,120,867, 5,278,264, 5,278,119, 5,304,614, 5,324,800 all of which are herein fully incorporated by reference. Also, the disclosures of EP-A-0 591 756, EP-A-0 520 732, EP-A- 0 420 436, WO 91/04257 WO 92/00333, WO 93/08221, and WO 93/08199 are all fully incorporated herein by reference.

Further, the metallocene catalyst component of the invention can be a monocyclopentadienyl heteroatom containing compound. This heteroatom is activated by either an alumoxane, an ionizing activator, a Lewis acid or a combination thereof to form an active polymerization catalyst system. These types of catalyst systems are described in, for example, PCT International Publication WO 92/00333, WO 94/07928, and WO 91/04257, WO 94/03506, U.S. Pat. Nos. 5,057,475, 5,096,867, 5,055,438, 5,198,401, 5,227,440 and 5,264,405 and EP-A-0 420 436, all of which are fully incorporated herein by reference. In addition, the metallocene catalysts useful in this invention can include non-cyclopentadienyl catalyst components, or ancillary ligands such as boroles or carbollides in combination with a transition metal or can be a bi-metallic transition metal compound. Additionally it is within the scope of this invention that the metallocene catalysts and catalyst systems may be those described in U.S. Pat. Nos. 5,064,802, 5,145,819, 5,149,819, 5,243,001, 5,239,022, 5,276,208, 5,296,434, 5,321,106, 5,329,031 and 5,304,614, PCT publications WO 93/08221 and WO 93/08199 and EP-A- 0 578 838 all of which are herein incorporated by reference.

The preferred transition metal component of the catalyst of the invention are those of Group 4, particularly, zirconium, titanium and hafnium. The transition metal may be in any oxidation state, preferably +3 or +4 or a mixture thereof For the purposes of this patent specification the term "metallocene catalyst" is defined to contain at least one metallocene catalyst component containing one or more cyclopentadienyl moiety in combination with a transition metal. In one embodiment the metallocene catalyst component is represented by the general formula $(Cp)_mMR_nR'_p$ wherein at least one Cp is an unsubstituted or, preferably, at least one Cp is a substituted cyclopentadienyl ring or cyclopentadienyl moiety, symmetrical or unsymetrically substituted; M is a Group 4, 5 or 6 transition metal; R and R' are independently selected halogen, hydrocarbyl group, or hydrocarboxyl groups having 1–20 carbon atoms or combinations thereof; m=1–3, n=0–3, p=0–3, and the sum of m+n+p equals the oxidation state of M, preferably m=2, n=1 and p=1. The Cp can be substituted with a a combination of substituents, which can be the same or different. Non-limiting examples of substituents include hydrogen or a linear, branched or cyclic alkyl, alkenyl or aryl radical having from 1 to 20 carbon atoms. The substituent can also be substituted with hydrogen or a linear, branched or cyclic alkyl, alkenyl or aryl radical having from 1 to 20 carbon atoms. In addition, the Cp can be a substituted or unsubstituted ring system such as an indenyl moiety, a benzindenyl moiety, a fluorenyl moiety or, the like.

In another embodiment the metallocene catalyst component is represented by one of the formulas:

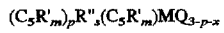

and

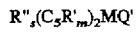

wherein M is a Group 4, 5, 6 transition metal, at least one $C_5R'_m$ is a substituted cyclopentadienyl, each R', which can be the same or different is hydrogen, alkyl, alkenyl, aryl, alkylaryl or arylalkyl radical having from 1 to 20 carbon atoms or two or more carbon atoms joined together to form a part of a substituted or unsubstituted ting or ring system having 4 to 20 carbon atoms, R" is one or more of or a combination of a carbon, a germanium, a silicon, a phosphorous or a nitrogen atom containing radical bridging two $(C_5R'_m)$ rings, or bridging one $(C_5R'_m)$ ring to M, when p=0 and x=1 otherwise "x" is always equal to 0, each Q which can be the same or different is an aryl, alkyl, alkenyl, alkylaryl, or arylalkyl radical having from 1 to 20 carbon atoms, halogen, or alkoxides, Q' is an alkylidene radical having from 1–20 carbon atoms, s is 0 or 1 and when s is 0, m is 5 and p is 0, 1 or 2 and when s is 1, m is 4 and p is 1.

For the purposes of this patent specification and appended claims, the terms "cocatalysts" and "activators" are used interchangeably and are defined to be any compound or component which can activate a metallocene catalyst as defined above, for example, an electron donor or any other compound that can convert a neutral metallocene catalyst component to a metallocene cation. It is within the scope of this invention to use alumoxane as an activator, and/or to also use ionizing activators, neutral or ionic, or compounds such as tri (n-butyl) ammonium tetra bis(pentaflurophenyl) boron or trisperfluoro phenyl boron metalloid precursor, which ionize the neutral metallocene compound.

There are a variety of methods for preparing alumoxane, non-limiting examples of which are described in U.S. Pat. Nos. 4,665,208, 4,952,540, 5,091,352, 5,206,199, 5,204, 419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, all of which are fully incorporated herein by reference.

Ionizing compounds may contain an active proton, or some other cation associated with but not coordinated or only loosely coordinated to the remaining ion of the ionizing compound. Such compounds and the like are described in EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197 and 5,241,025 and U.S. Pat. application Ser. No. 08/285,380, filed Aug. 3, now abandoned, and are all herein fully incorporated by reference. Combinations of activators are also contemplated by the invention, for example, alumoxanes and ionizing activators in combinations, see for example, WO 94/07928.

In an embodiment of the invention two or more metallocene catalyst components as describe above can be combined to form a catalyst system useful in the invention. For example, those mixed catalysts described in U.S. Pat. No. 5,281,679 and U.S application Ser. No. 138,818 filed Oct. 14, 1993, now U.S. Pat. No. 5,466,649 both of which are fully incorporated herein by reference. In another embodiment, metallocene catalyst components can be combined to form the blend compositions as described in PCT publication WO 90/03414 published Apr. 5, 1990, fully incorporated herein by reference. In yet another embodiment mixed metallocenes as described in U.S. Pat. Nos. 4,937,299 and 4,935,474, both are herein fully incorporated herein by reference, can be used to produce polymers having a broad molecular weight distribution and/or a multimodal molecular weight distribution.

In another embodiment of the invention at least one metallocene catalyst can be combined with a non-metallocene or traditional Ziegler-Natta catalyst or catalyst system, non-limiting examples are described in U.S. Pat. Nos. 4,701,432, 5,124,418, 5,077,255 and 5,183,867 all of which are incorporated herein by reference.

For purposes of this patent specification the terms "carrier" or "support" are interchangeable and can be any support material, preferably a porous support material, such as for example, talc, inorganic oxides, inorganic chlorides, for example magnesium chloride and resinous support materials such as polystyrene or polystyrene divinyl benzene polyolefins or polymefic compounds or any other organic support material and the like, or mixtures thereof.

The preferred support materials are inorganic oxide materials, which include those of Groups 2, 3, 4, 5, 13 or 14 metal oxides. In a preferred embodiment, the catalyst support materials include silica, alumina, silica-alumina, and mixtures thereof. Other inorganic oxides that may be employed either alone or in combination with the silica, alumina or silica-alumina are magnesia, titania, zirconia, and the like.

It is preferred that the carrier of the catalyst of this invention has a surface area in the range of from about 10 to about 700 $m^2/g$, pore volume in the range of from about 0.1 to about 4.0 cc/g and average particle size in the range of from about 10 to about 500 μm. More preferably, the surface area is in the range of from about 50 to about 500 $m^2/g$, pore volume of from about 0.5 to about 3.5 cc/g and average particle size of from about 20 to about 200 μm. Most preferably the surface area range is from about 100 to about 400 $m^2/g$, pore volume from about 0.8 to about 3.0 cc/g and average particle size is from about 10 to about 100 μm. The pore size of the carrier of the invention typically has pore size in the range of from 10 to 1000 Å, preferably 50 to about 500 Å and most preferably 75 to about 350 Å.

Methods of Producing the Catalyst System of the Invention

The catalyst systems useful in the process of the invention can be made in a variety of different ways. In a preferred embodiment, the metallocene catalyst component is supported on a carrier, optionally with an activator. In one embodiment, the metallocene catalyst component can be supported on a carrier and the activator added to the reactor, optionally on a support material which can be the same as or different from the carrier. In another embodiment, the metallocene catalyst component and the activator can be added to the reactor as a spray, see for example U.S. Pat. No. 5,317,036 herein fully incorporated by reference.

In the most preferred embodiment, the catalyst system, which includes the metallocene catalyst component and the activator, is supported on a carrier. Non-limiting examples of supporting the catalyst system used in the invention are described in U.S. Pat. Nos. 4,937,217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706 and U.S. patent application Ser. Nos. 138,818, filed Oct. 14 1993, now U.S. Pat. No. 5,466,649, 170,108 filed Dec. 20, 1993, now abandoned, 182 244 filed Jan. 14 1994, now abandoned, 233 668 filed Apr. 26 1994, now abandoned, 271 598 filed Jul. 7, 1994, now abandoned, 287,327, filed Aug. 8, 1994, now U.S. Pat. No. 5,489,024, all of which are hereto incorporated by reference.

The preferred method for producing the catalyst of the invention is described below and can be found in U.S. application Ser. Nos. 265 532 filed Jun. 24, 1994, now abandoned, and 265,533, filed Jun. 24, 1994, now abandoned, both are herein fully incorporated by reference in their entirety.

In a preferred embodiment, the metallocene catalyst component is typically slurried or dissolved in a liquid to form a metallocene solution and a separate solution is formed containing an activator and a liquid. The liquid can be any compatible solvent or other liquid capable of forming a solution or the like with at least one metallocene catalyst component and/or at least one activator. In a preferred embodiment the liquid is a cyclic aliphatic or aromatic hydrocarbon, most preferably toluene. The metallocene and activator solutions are preferably mixed together and added to a porous support such that the total volume of the metallocene solution and the activator solution or the metallocene and activator solution is less than four times the pore volume of the porous support, more preferably less than three times, even more preferably less than two times the pore volume. Preferably, the range for the total volume of the metallocene solution and activator solution or the metallocene/activator solution added to a porous support is between about 1 to about 3 times, preferably 1 times to about 2.5 times the pore volume of the porous support. In an alternative preferred embodiment the range of the total volume of the solutions is in the range of from 1.1 to about 2.5 times, preferably about 1.5 to about 2.5 times, and most preferably from about 1.2 to about 2.4 times the pore volume of the carrier used to form the catalyst.

A surface modifier can be added at any stage in the preceding methods of making the catalyst system useful in the process of the invention. Preferably, the surface modifier is added after the solution is added to the porous support. See U.S. patent application No. 08/322,675 filed Oct. 13, 1994, now abandoned, fully incorporated herein by reference.

The procedure for measuring the total pore volume of a porous support is well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well know in the art is described in Innes, *Total Porosity and Particle Density of Fluid Catalysts By Liquid Titration*, Vol. 28, :No. 3, Analytical Chemistry 332–334 (March, 1956).

In another embodiment, the supported catalyst is produced by contacting an organometallic compound, such as trimethyl aluminum with silica containing water, absorbed or adsorbed, within the carrier to form an activator, alumoxane for example. In this particular embodiment, the metallocene catalyst component is then added to the carrier and formed activator with or separately from a surface modifier, preferably after the metallocene has been added.

In one embodiment the catalyst system of the invention can be added in a dry or slurry state to the reactor.

In one embodiment of the process of the invention, the catalyst system is prepolymerized in the presence of monomers, ethylene and/or an alpha-olefin monomer having 3 to 20 carbon atoms prior to the main polymerization. The prepolymerization can be carried out batchwise or continuously in gas, solution or slurry phase including at elevated pressures. The prepolymerization can take place with any monomer or combination thereof and/or in the presence of any molecular weight controlling agent such as hydrogen. For details on prepolymerization see U.S. Pat. Nos. 4,923, 833 and 4,921,825 and EP-B-0279 863, published Oct. 14, 1992 all of which are fully incorporated herein by reference.

The mole ratio of the metal of the activator component to the transition metal of the metallocene component is in the range of ratios between 0.3:1 to 1000:1, preferably 20:1 to 800:1, and most preferably 50:1 to 500:1. Where the activator is an ionizing activator as previously described the mole ratio of the metal of the activator component to the transition metal component is preferably in the range of ratios between 0.3:1 to 3:1.

Polymerization Process of the Invention

The catalysts and catalyst systems described above are suited for the polymerization of monomers in a gas phase polymerization process.

In a preferred embodiment the invention is directed toward gas phase polymerization reactions involving the polymerization of two or more of the monomers including ethylene and at least one alpha-olefin monomer having from 3 to 20 carbon atoms, preferably 3–12 carbon atoms. The invention is particularly well suited to the copolymerization reactions involving the polymerization of one or more of the monomers, for example alpha-olefin monomers of ethylene, propylene, butene-1, pentene-1, 4-methylpentene-1, hexene-1, octerie-1, decerie-1, and cyclic olefins such as cyclopentene, and styrene or a combination thereof. Other monomers can include polar vinyl, diolefins such as dienes, polyenes, norbornene, norbornadiene, acetylene and aldehyde monomers. Preferably a copolymer of ethylene or propylene is produced. Preferably the comonomer is an alpha-olefin having from 3 to 15 carbon atoms, preferably 4 to 12 carbon atoms and most preferably 4 to 10 carbon atoms.

In another embodiment ethylene or propylene is polymerized with at least two different comonomers to form a terpolymer and the like, the preferred comonomers are a combination of alpha-olefin monomers having 3 to 10 carbon atoms, more preferably 3 to 8 carbon atoms, optionally with at least one diene monomer. The preferred terpolymers include the combinations such as ethylene/butene-1/ hexene-1, ethylene/propylene/butene-1, propylene/ethylene/ butene- 1, propylene/ethylene/hexene-1, ethylene/ propylene/norbornadiene and the like.

In another embodiment the invention relates to a gas phase process for producing olefin based elastomeric polymers produced by the copolymerization of ethylene, an alpha-olefin having from 3 to 20 carbon atoms and a diene monomer. Non-limiting common elastomers include copolymers of ethylene and propylene often referred to as EP elastomers and terpolymers of ethylene, propylene and a diene monomer often referred to as EPDM elastomers. For the purposes of this patent specification and appended claims "EPDM" encompasses polymers comprised of ethylene, an alpha-olefin, and one or more non-conjugated diene monomer. The non-conjugated diene monomer can be straight chain, branched chain or cyclic hydrocarbon diene having from about 6 to 20 carbon atoms. Non-limiting examples of non-conjugated dienes are straight chain acyclic dienes such as 1,4-hexadiene and 1,6-octadiene; branched chain acyclic dienes include 5-methyl-1,4-hexadiene, 3,-7-dimethyl-1,6-octadiene, 3,7-dimethyl-1,7-octadiene and mixed isomers of dihydro myricene and dihydro cinene; single ring alicyclic dienes such as 1,3-cyclopentadiene, 1,4-cyclopentadiene and 1,5-cyclododecadiene; and multi-ring alicyclic methyltetrahydroindene, dicyclopentadiene, bicyclo-(2,2,1)-hepta-2,5-diene; alkenyl, alkylidene, cycloalkenyl, and cycloalkylidene norbornenes such as 5-methylene-2-norbornene, 5-propenyl-2-norbornene, 5-iso-propylidene-2-norbornene, 5-(4-cyclopentenyl)-2-norbornene, 5-cyclohexylidene-2-norbornene, 5-vinyl-2-norbornene and norbornadiene.

The dienes typically preferred are 1,4-hexadiene (HD), 5-ethylidene-2-norbornene (ENB), 5-vinylidiene-2-norbornene (VNB), 5-methylene-2-norbornene (MNB), and dicyclopentadiene (DCPD), the most preferred dienes are 5-ethylidene-2-norbornene (ENB) and 1,4-hexadiene.

Typically in a gas phase polymerization process a continuous cycle is employed where in one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. See for example U.S. Pat. Nos. 4,543,399, 4,588,790, 5,028,670 and 5,352,749 and U.S. application Ser. No. 216,520 Mar. 22, 1994, now U.S. Pat. No. 3,405,922, U.S. application Ser. No. 08/306,055 filed Sep. 14 1994, pending and U.S. application Ser. No. 08/317,136, filed Oct. 3, 1994, now abandoned, all of which are fully incorporated herein by reference.

In a preferred embodiment of the invention the process is a gas phase polymerization process operating in a condensed mode. For the purposes of this patent specification and appended claims the process of purposefully introducing a liquid and a gas phase into a reactor such that the weight percent of liquid based on the total weight of the recycle stream is greater than about 2.0 weight percent is defined to be operating a gas phase polymerization process in a "condensed mode".

In one embodiment of the process of the invention the weight percent of liquid in the recycle stream based on the total weight of the recycle stream is in the range of about 2 to about 50 weight percent, preferably greater than 10 weight percent and more preferably greater than 15 weight percent and even more preferably greater than 20 weight percent and most preferably in the range between about 20 and about 40 percent.

In another embodiment of the process of the invention a surface modifier or antistatic agent as described in U.S. Pat. No. 5,238,278 and U.S. application Ser. No. 08/322,675, filed Oct. 13, 1994, now abandoned can be introduced into the reactor together, separately or apart, from the catalyst system of the invention.

In a preferred embodiment of the process of the invention the process is operated in the absence of or essentially free of a scavenger as is described in U.S. application Ser. No. 08/306,055, filed Sep. 14, 1994, pending.

For the purposes of this patent specification and appended claims a "scavenger" is any organometallic compound which is reactive towards oxygen and/or water and/or polar compounds and which does not include the catalyst components of the invention. Non-limiting examples of scavengers can be generally represented by the formula $R_nA$, where A is a Group 12 or 13 element, each K, which can be the same or different, is a substituted or unsubstituted, straight or branched alkyl radical, cyclic hydrocarbyl, alkyl-cyclo hydrocarbyl radicals or an alkoxide radical, where n is 2 or 3. Typical scavengers include trialkylaluminum compounds such as trimethylaluminum, triethylaluminum, triisopropyl aluminum, tri-sec-butyl aluminum, tri-t-butyl aluminum tri-isobutyl aluminum, trialkyl boranes and alkoxides and the like.

In one embodiment of the process of the invention the process is essentially free of a scavenger. For the purposes of this patent specification and appended claims the term "essentially free" means that during the process of the invention no more than 10 ppm of a scavenger based on the total weight of the recycle stream is present at any given point in time during the process of the invention.

In another embodiment during reactor start-up to remove impurities and ensure polymerization is initiated, a scavenger is present in an mount less than 300 ppm, preferably less than 250 ppm, more preferably less than 200 ppm, even more preferably less than 150 ppm, still more preferably less than 100 ppm, and most preferably less than 50 ppm based on the total bed weight of a fluidized bed during the first 12 hours from the time the catalyst is placed into the reactor, preferably up to 6 hours, more preferably less than 3 hours, even more preferably less than 2 hours, and most preferably less than 1 hour and then the introduction of the scavenger is halted.

In one embodiment the reactor utilized in the present invention is capable of producing greater than 500 lbs/hr (227 kg/hr) to about 200,000 lbs/hr (90,900 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 50,000 lbs/hr (22,700 kg/hr) and most preferably greater than 65,000 lbs/hr (29,000 kg/hr) to greater than 100,000 lbs/hr (45,500 kg/hr).

The hydrogen content in the gas phase is typically less than 10,000 ppm to less than about 50 ppm, preferably less than 5000 ppm, even more preferably less than 1000 ppm and still even more preferably less than 200 ppm, and most preferably less than 100 ppm.

The reactivity ratios of the catalysts and catalyst systems of this invention are generally less than 2, preferably less than 1.8 and more preferably less than 1.5 and most preferably less than about 1. Reactivity ratio is defined to be the mole ratio of comonomer to monomer in the recycle stream ($C_x/C_y$) divided by the mole ratio of the comonomer to monomer in the polymer product, where $C_x$ is the mole percent of comonomer and $C_y$ is the mole percent of the monomer.

The preferred mole percent of ethylene in the gas phase is from about 15 to about 75 mole percent.

The reactor pressure may vary from about 100 psig (689.7 kPag) to about 500 psig (3448.3 kPag), preferably in the range of about 200 psig (1379.3 kPag) to about 400 psig (2758.6 kPag) and most preferably in the range of about 250 psig (1724.1 kPag) to about 350 psig (2413.8 kPag).

Typically reactor temperatures are in the range of about 65° F. (18.3° C.) to about 185° F. (85 ° C.), preferably in the range of about 70° F. (21 ° C.) to about 185° F. (85° C.), more preferably in the range of about 75° F. (24° C.) to about 185° F. (85° C.), even more preferably in the range of about 80° F. (27° C.) to about 185° F. (85° C.) and most preferably in the range of about 90° F. (32° C.) to about 180° F. (82° C.).

The superficial gas velocity of the gas flow through the reactor generally exceeds the minimum flow required for fluidization which is typically from about 0.2 ft/sec (0.061 m/s) to about 0.5 ft/sec (0.153 m/s). Preferably, the superficial gas velocity is maintained above about 0.7 ft/see (0.214 m/s), more preferably at not less than 1.0 ft/sec (0.305 m/s) to about 5 ft/sec (1.5 m/s).

In another embodiment the process is operated at a reactor temperature of within 10° C., preferably 8° C., more preferably within 5° C. and most preferably within 3° C. of the first melting point of the highest melting peak containing a majority of the polymer measured by Differential Scanning Colorimetry (DSC) methods known in the art using a General V4.1C Dupont 2200 machine.

The catalyst productivity (grams of catalyst per gram of polymer (g/g)) is typically greater than 4000, more preferably greater than 5000, even more 5 preferably greater than 5500 and most preferably greater than 6000.

In one embodiment where the polymer product is an ethylene/propylene copolymer the catalyst has a productivity greater than 1500, preferably greater than 2000, more preferably greater than 2500 and most preferably greater than 3000.

Polymer Produced by the Process of the Invention

The polymers of the process of the invention typically have a density in the range of from about 0.85 g/cc to about 0.90 g/cc, preferably in the range of from about 0.86 g/cc to less than 0.900 g/cc, more preferably in the range of from about 0.86 g/cc to about 0.898 g/cc, even more preferably in the range of from about 0.86 g/cc to about 0.90 g/cc, still even more preferably in the range of from about 0.86 g/cc to about 0.88 g/cc and most preferably in the range of from about 0.865 g/cc to about 0.885 g/cc.

The polymers of the process of the invention have a weight average molecular weight (Mw) greater than about 40,000 to about 650,000, preferably greater than 45,000 and more preferably greater than 50,000 even more preferably greater than 60,000 and most preferably greater than 70,000.

The melt index (MI) of the polymers of the process of the invention are in the range of from about 0.001 dg/min to about 30 dg/min, preferably in the range of from about 0.01 to about 25 dg/min, more preferably in the range of from about 0.01 dg/min to about 20 dg/min, even more preferably in the range of from at least 0.01 dg/min to about 10 dg/min, still even more preferably from about 0.01 dg/min to about 5 dg/min and most preferably from at least 0.01 dg/min to about 1 dg/min, preferably less than about 1 dg/min. MI as measured herein was determined according to ASTM D-1238E.

The polymers of the invention have a Mw/Mn (Mn is the number average molecular weight) generally in the range of from about 1.5 to about 30, preferably in the range of from about 1.8 to about 10, more preferably from about 2 to about 8 and most preferably from about 2.2 to about 6.

Another characteristic of the very low density polymers of the invention are their composition distribution (CD). A measure of composition distribution is the "Composition Distribution Breadth Index"("CDBI"). CDBI is defined as the weight percent of the copolymer molecules having a comonomer content within 50% (that is, 25% on each side) of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, vol. 20, p. 441 (1982) and U.S. Pat. No. 5,008,204, which are incorporated herein by reference.

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature the weight fractions are assumed to have a Mn≧15,000, where Mn is the number average molecular weight fraction. Low weight fractions generally represent a trivial portion of the polymer of the present invention. The remainder of this description and the appended claims maintain this convention of assuming all weight fractions have a Mn≧15,000 in the CDBI measurement.

From the weight fraction versus composition distribution curve the CDBI is determined by establishing what weight percent of the sample has a comonomer content within 25% each side of the median comonomer content. Further details of determining the CDBI of a copolymer are known to those skilled in the art. See, for example, PCT Pat. Application WO 93/03093, published Feb. 18, 1993.

The polymers of the invention have CDBI's generally in the range of 10 to 99%, preferably greater than 20%, most preferably greater than 30%. In another embodiment the polymers of the invention have a CDBI in the range of greater than 50% to 99%, preferably in the range of 55% to 85%, and more preferably 60% to 80%, even more preferably greater than 60%, still even more preferably greater than 65%.

In the process of the invention the preferred monomer is ethylene in combination with one or more other $C_3$ to $C_{20}$ alpha-olefin monomers, preferably $C_3$ to $C_{10}$ alpha-olefins. The weight percent of ethylene in the polymer is typically in the range of from about 85 weight percent to about 50 weight percent, preferably from about 80 weight percent to about 60 weight percent, and more preferably from about 80 weight percent to about 65 weight percent.

In another embodiment the lower melting polymer ingredient of the polymer produced by the process of the invention typically has essentially a single melting point (second melt) characteristic with a peak melting point (Tm) as determined by DSC in the range of from about 20° C. to about 115° C., preferably in the range of about 30° C. to about 110° C. and even more preferably in the range of from about 40° C. to about 105° C. and most preferably in the range of from about 40° C. to about 100° C. The term "essentially a single melting point" as used in this patent specification and appended claims means that at least 80 percent by weight of the polymer corresponds to a single Tm peak existing in the range of from about 20° C. to about 115° C.

In yet another embodiment the polymer produced by the process of the invention can have more than one melting peak, it can also have a unimodal, narrow, broad or multimodal molecular weight distribution or combination thereof.

The bulk density of the polymer produced by the process of the invention is in the range of greater than 0.25 g/cc to about 0.55 g/cc, preferably in the range of 0.30 g/cc to greater than about 0.45 g/cc and most preferably greater than 0.35 g/cc.

In one embodiment where the polymer is a propylene copolymer, an ethylene/propylene copolymer, the preferred density range is between about 0.855 g/cc to about 0.880 g/cc and have a melt index in the range of 0.001 dg/min to about 20 dg/min.

In another embodiment where the polymer is an ethylene copolymer, particularly an ethylene/butene-1 copolymer, the density is in the range of greater than 0.855 g/cc to about 0.898 g/cc and a melt index in the range of greater than 0.001 dg/min to about 20 dg/min, preferably greater than about 0.05 dg/min to about 10 dg/min.

Typically the EPDM polymers produced by the invention contain non-conjugated dienes in the EPDM polymers in the range of about 0.1 to about 15 weight percent, preferably from about 0.5 to about 10 weight percent, even more preferably from about 1 to about 5, and most preferably from about 2 to 5 weight percent. More than one of the previously described dienes may be incorporated simultaneously with the total diene incorporating being within the above ranges. See U.S. Pat. No. 5,229,478, fully incorporated herein by reference for additional information.

The polymers produced by the process of the invention are useful in such forming operations include film, sheet, and fiber extrusion and co-extrusion as well as blow molding, injection molding, sheet thermoforming and rotational molding. Films include blown or cast films in monolayer or multilayer constructions formed by coextrusion or by lamination. Such films are useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fiber forming operations include melt spinning, solution spinning and melt blown fiber operations. Such fibers may be used in woven or non-woven form to make filters, diaper fabrics, medical garments, geotextiles, etc. General extruded articles include medical tubing, wire and cable coatings, geomembranes, and pond liners. Molded articles include single and multi-layered constructions in the form of bottles, tanks, large hollow articles, rigid food containers and toys, etc. Some uses for the polymer of this invention are described in U.S. Pat. Nos. 5,358,792, 5,246,783, 5,206,075, 5,241,031 and, 5,322,728, all of which are herein fully incorporated by reference.

In some instances where it is necessary to improve processability and manipulate final end product characteristics the polymers produced by this present invention can be blended or coextruded into single or multilayer films or the like with various other polymers well known in the art, for instance, LLDPE, LDPE, HDPE, polypropylene, PB, EVA and the like and static controlling agents such as sorbitol.

EXAMPLES

In order to provide a better understanding of the present invention including representative advantages and limitation thereof, the following examples are offered.

The properties of the polymer were determined by the following test methods:

Melt Index is measured in accordance with ASTM D-1238-Condition E.

Density is measured in accordance with ASTM-D-1505.

Bulk Density is measured as follows; the resin is poured via a ⅞" diameter funnel into a fixed volume cylinder of 400 cc; the bulk density is measured as the weight of resin in the cylinder divided by the 400 cc to give a value in g/cc.

Example 1

Preparation of the Catalyst

The metallocene catalyst was prepared from 800 lbs (364 kg) of silica (Davison 948 available from W. R. Grace, Davison Chemical Division, Baltimore, Md.) dehydrated at 600° C. The catalyst was a commercial scale catalyst prepared in a mixing vessel with an agitator. An initial charge of 1156 pounds (525 kg) toluene was added to the mixer. This was followed by mixing 925 pounds (420 kg) of 30 percent by weight methyl alumoxane (MAO) in toluene (available from Albemarle Corporation, Baton Rouge, La.). This was followed with 100 pounds (46 kg) of 20 percent by weight bis(1,3-methyl-n-butyl cyclopentadienyl) zirconium dichloride in toluene (20.4 pounds (9.3 kg) of contained metallocene). An additional 144 pounds (66 kg) of toluene was added to the mixer to rinse the metallocene feed cylinder and allowed to mix for 30 minutes at ambient conditions. The above mixture was added to the silica after which 54.3 pounds (25 kg) of a Kernamine AS-990 in toluene solution, surface modifier solution, containing 5.3 pounds (2.4 kg) of contained Kernamine AS-990 (available from Witco Chemical Corporation, Houston, Tex.). An additional 100 pounds (46Kg) of toluene rinsed the surface modifier container and was added to the mixer. The total liquid volume was equivalent to 2.4 cc/cc pore volume of the silica. The resulting slurry was vacuum dried at 3.2 psia (22 kPa) at 175° F. (79° C.) to a free flowing powder. The final catalyst weight was 1093 pounds (497 kg). The catalyst had a final zirconium loading of 0.40 weight percent and an aluminum loading of 12.0 weight percent.

Polymerization

The polymerization was conducted in a 16 inch (41 cm) diameter continuous gas phase fluidized bed reactor in the presence of the catalyst prepared above. The fluidized bed is made up of polymer granules. The gaseous feed streams of monomer, ethylene, and hydrogen together with liquid comonomer were mixed together and introduced below the reactor bed into the recycle gas line. The individual flow rates of monomer, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentration of all the gases were measured by an on-line gas chromatograph to ensure relatively constant composition in the recycle gas stream.

The solid catalyst was injected directly into the fluidized bed using purified nitrogen as a carrier. Its rate was adjusted to maintain a constant production rate. No alkyl, for example trialkylaluminum was used. The reacting bed of growing polymer particles is maintained in a fluidized state by the continuous flow of the make up feed and recycle gas through the reaction zone. The reactor was operated at a total pressure of 300 psig (2069 kPa). To maintain a constant reactor temperature, the temperature of the recycle gas is continuously adjusted up or down to accommodate any changes in the rate of heat generation due to the polymerization.

The fluidized bed was maintained at a constant height by withdrawing a portion of the bed at a rate equal to the rate of formation of particulate product. The product is removed continuously via a series of valves into a fixed volume chamber, which is simultaneously vented back to the reactor. This allows for the highly efficient removal of the product, while at the same time recycling a large portion of the unreacted gases back to the reactor. This product is purged to remove entrained hydrocarbons and treated with a small stream of humidified nitrogen to deactivate any trace quantities of residual catalyst.

The process and product conditions and results were as follows:

Runs 1–6 illustrate the process of this invention. In all Runs 1–6 there was no indication of fouling or sheeting. The polymer product produced was dry with good particle morphology.

While the present invention has been described and illustrated by reference to particular embodiments, it will be appreciated by those of ordinary skill in the art that the invention lends itself to variations not necessarily illustrated herein. The catalyst of the invention can be used in a single reactor or in a series reactor or even in series where one reactor is a slurry reactor and the other being a gas phase reactor. It is contemplated that the catalyst of the invention can be mixed with a traditional Ziegler-Natta catalyst or a catalyst of the invention can be separately introduced with a traditional Ziegler-Natta catalyst or any other metallocene catalyst system. For this reason, then, reference should be made solely to the appended claims for purposes of determining the true scope of the present invention.

We claim:

1. A continuous gas phase process for polymerizing two or more olefins without the addition of pulverant inorganic materials and in the presence of a metallocene catalyst system to produce a polymer having a density less than 0.88 g/cc and a melt index less than 20 dg/min, the process operating essentially free of a scavenger.

2. The process of claim 1 wherein the process is a gas phase fluidized bed polymerization process.

3. The process of claim 1 wherein the process is operating in a condensed mode.

4. The process of claim 1 wherein the olefins are ethylene and at least one alpha-olefin monomer having from 3 to 20 carbon atoms.

5. The process of claim 1 wherein the olefins are ethylene and at least one diene monomer having from 3 to 20 carbon atoms.

6. The process of claim 1 wherein the metallocene catalyst system comprises at least one metallocene catalyst component.

7. The process of claim 1 wherein the metallocene catalyst system comprises an ionizing activator or an alumoxane or a combination thereof.

TABLE 1

| Run | 1 | 2 | 3 | 4 | 5 | 6 |
|---|---|---|---|---|---|---|
| Density (g/cc) | 0.8852 | 0.8852 | 0.8800 | 0.8856 | 0.8996 | 0.865 |
| Melt Index (dg/min) | 3.06 | 2.21 | 0.79 | 2.94 | 1.22 | 0.8 |
| Bulk Density (g/cc) | 0.337 | 0.375 | 0.380 | 0.353 | 0.408 | 0.35 |
| APS (microns) | 1298 | 1120 | 1120 | 1255 | 1060 | 1150 |
| Mw/Mn | 1.92 | 2.00 | — | — | 2.03 | — |
| Mw | 77,609 | 82,587 | — | — | 94,043 | — |
| Ethylene (mole %) | 30.0 | 30.0 | 30.0 | 30.0 | 35.0 | 25.0 |
| Butene (mole %) | 3.89 | 3.82 | 4.29 | 5.17 | 1.39 | — |
| Hexene (mole %) | — | — | — | — | 0.762 | — |
| Propylene (mole %) | — | — | — | — | — | 10 |
| Hydrogen (ppm) | 169.4 | 143.4 | 95.16 | 184.96 | 94.78 | 35 |
| H2/C2* = ratio | 5.65 | 4.78 | 3.17 | 6.17 | 2.71 | 1.4 |
| C4/C2 = mole ratio | 0.130 | 0.127 | 0.143 | 0.173 | 0.040 | — |
| C6/C2 = mole ratio | — | — | — | — | 0.022 | — |
| C4/C6 = mole ratio | — | — | — | — | 1.83 | — |
| C3/C2 = mole ratio | — | — | — | — | — | 0.4 |
| Alkyl Feed cc/hour | 0.0 | 0.0 | 0.0 | 0.0 | 0.0 | 0.0 |
| Productivity (g/g) | 5824 | 5135 | 4733 | 7939 | 4276 | 2300 |
| Temperature (°F.) | 122 | 122 | 122 | 145 | 160 | 95 |
| Temperature (°C.) | 50 | 50 | 50 | 63 | 71 | 35 |
| Pressure (PSIG) | 300 | 300 | 300 | 300 | 300 | 300 |
| Pressure (kPag) | 2069 | 2069 | 2069 | 2069 | 2069 | 2069 |
| Gas Velocity (ft/sec) | 2.25 | 2.25 | 2.25 | 2.30 | 2.25 | 2.4 |
| Gas Velocity (m/sec) | 0.69 | 0.69 | 0.69 | 0.70 | 0.69 | 0.73 |
| S-T-Y kg/m³.hr | 59.4 | 71.1 | 74.6 | 69.1 | 62.8 | 60.5 |
| Bed Weight (lbs) | 200 | 178 | 180 | 180 | 468 | 100 |
| Bed Weight (kg) | 91 | 81 | 82 | 82 | 212 | 45 |
| Weight % $C_2$ in polymers | | | | | | 65 |

*ppm $H_2$/mole % $C_2$

8. The process of claim 1 wherein the metallocene catalyst system is supported on a carrier.

9. The process of claim 1 wherein the polymer has a density in the range of from about 0.85 g/cc to less than 0.88 g/cc.

10. The process of claim 1 wherein the polymer has a melt index in the range of from about 0.001 to about 10 dg/min.

11. The process of claim 1 wherein the polymer has a composition distribution breadth index greater than 45%.

12. The process of claim 1 wherein the polymer has a composition distribution breadth index greater than about 50%.

13. The process of claim 1 wherein the polymer has a composition distribution breadth index greater than about 60%.

14. The process of claim 1 wherein the polymer has essentially a single second melting peak temperature between about 20° C. to about 115° C.

15. A continuous gas phase process for polymerizing monomers in a fluidized bed reactor, said process comprising the steps of:

a) introducing a recycle stream into the reactor, the recycle stream comprising the monomers;

b) introducing a metallocene catalyst system into the reactor;

c) introducing less than 300 ppm of a scavenger based on the total bed weight and then discontinuing the introduction of the scavenger;

d) withdrawing the recycle stream from the reactor;

e) cooling the recycle stream;

f) introducing into said recycle stream additional monomers to replace the monomers polymerized;

g) reintroducing the recycle stream into the reactor; and h) withdrawing a polymer having a density less than 0.88 g/cc from the reactor;

wherein the process is free of the step of adding carbon black or pulverulent inorganic materials to the reactor to reduce the stickiness of the polymer.

16. The process of claim 15 wherein the recycle stream is cooled to form a liquid and a gas phase which is introduced into the reactor.

17. The process of claim 15 wherein the liquid and gas phase are introduced separately into the reactor.

18. The process of claim 15 wherein only the gas phase of the cooled recycle stream is introduced into the reactor.

19. The process of claim 15 wherein the monomers are ethylene and at least one alpha-olefin having from 3 to 20 carbon atoms and optionally at least one diene monomer having from 6 to 20 carbon atoms.

20. The process of claim 16 wherein the liquid phase in the recycle stream is greater than about 2 to about 40 weight percent based on the total weight of the recycle stream.

21. The process of claim 15 wherein the scavenger is introduced into the reactor in an amount less than 250 ppm.

22. The process of claim 15 wherein the scavenger is introduced into the reactor in an amount less than 200 ppm.

23. The process of claim 15 wherein the scavenger is introduced into the reactor in an amount less than 150 ppm.

24. The process of claim 15 wherein the scavenger is introduced into the reactor in an amount less than 100 ppm.

25. The process of claim 15 wherein the scavenger is introduced into the reactor in an amount less than 50 ppm.

26. The process of claim 15 wherein the scavenger is introduced during the first 1 to 3 hours from the time the metallocene catalyst system is introduced into the reactor.

27. The process of claim 15 wherein the scavenger is introduced during about the first hour from the time the metallocene catalyst system is introduced into the reactor.

28. The process of claim 15 wherein the metallocene catalyst system is supported on a carrier.

29. The process of claim 15 wherein the polymer has a density in the range of 0.85 g/cc to about 0.88 g/cc.

30. The process of claim 15 wherein the polymer has a melt index in the range of from about 0.001 dg/min to about 10 dg/min.

31. The process of claim 15 wherein the polymer has a composition distribution breadth index greater than 50%.

32. The process of claim 15 wherein the polymer has a bulk density greater than 0.35 g/cc.

33. A gas phase process for polymerizing ethylene and at least one alpha-olefin, optionally with at least one diene monomer in a fluidized bed reactor without the addition of pulverant inorganic materials, essentially free of a scavenger and in the presence of a metallocene catalyst system to produce a polymer product having a density less than 0.88 g/cc and a melt index less than 20 dg/min.

34. The process of claim 33 wherein the polymer product has a density in the range of from about 0.85 g/cc to less than 0.88 g/cc.

35. The process of claim 33 wherein the alpha-olefin has 3 to 20 carbon atoms.

36. The process of claim 33 wherein the diene monomer has 6 to 20 carbon atoms.

37. The process of claim 33 wherein the polymer product has a melt index less than 10 dg/min.

38. The process of claim 33 wherein the polymer has a melt index less than 5 dg/min.

39. The process of claim 33 wherein the polymerization takes place at a reactor temperature greater than 90° F.

40. The process of claim 33 wherein the polymerization takes place at a reactor temperature of greater than 95° F.

41. The process of claim 33 wherein the reactor is capable of producing greater than 500 lb of polymer per hour.

42. A continuous gas phase process for polymerizing ethylene and at least one alpha-olefin having 3 to 20 carbon atoms in a fluidized bed polymerization reactor at a temperature greater than 90° F. without the addition of pulverant inorganic materials and in the presence of a metallocene catalyst system capable of producing a polymer product having a density less than 0.88 g/cc and having a melt index less than 20 dg/min, the process operating in the absence of a scavenger.

43. The process of claim 42 wherein the polymer product contains in the range of from about 85 weight percent to about 50 weight percent ethylene.

44. The process of claim 42 wherein the polymer product contain in the range of from about 75 weight percent to about 50 weight percent ethylene.

45. The process of claim 42 wherein at least one diene monomer is introduced to the reactor.

46. The process of claim 45 wherein the polymerization reactor temperature is greater than about 95° F.

47. A continuous gas phase process for polymerizing ethylene and at least one monomer having 3 to 20 carbon atoms, optionally with at least one diene monomer in the presence of a supported metallocene catalyst system to produce a polymer product having a density less than 0.88 g/cc and a melt index less than 30 dg/min, the process operating without the need for the addition of an inorganic material to reduce the stickiness of the polymer product, and in the absence of a scavenger.

* * * * *

UNITED STATES PATENT AND TRADEMARK OFFICE
CERTIFICATE OF CORRECTION

PATENT NO. : 5,712,353
DATED : 01/27/98
INVENTOR(S) : E.E POIROT, V.R. SAGAR, S.K. JACKSON

It is certified that error appears in the above-identified patent and that said Letters Patent is hereby corrected as shown below:

ON THE TITLE PAGE:

Item [75] Inventors: Eugene Edmond Poirot, Baytown;
Vispi "Ruston" --Rustom-- Sagar, League City;
Scott Kevin Jackson, Baytown. All of Tex.

Signed and Sealed this

Twenty-fourth Day of November,1998

Attest:

BRUCE LEHMAN

Attesting Officer

Commissioner of Patents and Trademarks